United States Patent
Kim et al.

(10) Patent No.: US 10,340,510 B2
(45) Date of Patent: Jul. 2, 2019

(54) POSITIVE ELECTRODE ACTIVE MATERIAL FOR LITHIUM SECONDARY BATTERY, PREPARING METHOD THEREOF, AND LITHIUM SECONDARY BATTERY INCLUDING POSITIVE ELECTRODE INCLUDING THE SAME

(71) Applicant: SAMSUNG SDI CO., LTD., Yongin-si, Gyeonggi-do (KR)

(72) Inventors: JinHwa Kim, Yongin-si (KR); JoongHo Moon, Yongin-si (KR); JeonJin Choi, Yongin-si (KR); YuMi Song, Yongin-si (KR); MinHan Kim, Yongin-si (KR); DoHyung Park, Yongin-si (KR); SeonYoung Kwon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 113 days.

(21) Appl. No.: 15/343,309

(22) Filed: Nov. 4, 2016

(65) Prior Publication Data

US 2017/0133668 A1 May 11, 2017

(30) Foreign Application Priority Data

Nov. 6, 2015 (KR) .................. 10-2015-0155787

(51) Int. Cl.
*H01M 4/36* (2006.01)
*H01M 4/505* (2010.01)
(Continued)

(52) U.S. Cl.
CPC ............ *H01M 4/364* (2013.01); *C01G 53/50* (2013.01); *H01M 4/505* (2013.01); *H01M 4/525* (2013.01);
(Continued)

(58) Field of Classification Search
CPC ...... H01M 4/364; H01M 4/505; H01M 4/525; H01M 10/0525; H01M 2004/028;
(Continued)

(56) References Cited

U.S. PATENT DOCUMENTS 7,695,649 B2 4/2010 Paulsen et al.
8,865,348 B2 10/2014 Sun et al.
(Continued)

FOREIGN PATENT DOCUMENTS

EP 2 023 426 A1 2/2009
JP 2003-059489 2/2003
(Continued)

OTHER PUBLICATIONS

X. Fu, et al. "Low temperature synthesis of $LiNiO_2@LiCoO_2$ as cathode materials for lithium ion batteries", J Solid State Electrochem (2010), 14, pp. 1117-1124.

*Primary Examiner* — Peter F Godenschwager
*Assistant Examiner* — Andrew J. Oyer
(74) *Attorney, Agent, or Firm* — Lee & Morse, P.C.

(57) ABSTRACT

A positive electrode active material for a lithium secondary battery, a method of preparing the same, and a lithium secondary battery, the positive electrode active material including nickel, cobalt, and manganese, wherein the positive electrode active material has a core part and a surface part, an amount of manganese in the core part and the surface part is higher than 25 mol %, and amounts of nickel and cobalt in the positive electrode active material vary such that a concentration gradient of the nickel and the cobalt in a direction from the core part to the surface part is present in the positive electrode active material.

18 Claims, 6 Drawing Sheets

(51) Int. Cl.
*H01M 4/525* (2010.01)
*H01M 10/0525* (2010.01)
*C01G 53/00* (2006.01)
*H01M 4/02* (2006.01)

(52) U.S. Cl.
CPC ..... *H01M 10/0525* (2013.01); *C01P 2002/20* (2013.01); *C01P 2002/89* (2013.01); *C01P 2004/03* (2013.01); *C01P 2006/40* (2013.01); *H01M 2004/028* (2013.01); *Y02T 10/7011* (2013.01)

(58) Field of Classification Search
CPC .. C01G 53/50; C01P 2002/20; C01P 2002/89; C01P 2004/03; C01P 2006/40
See application file for complete search history.

(56) References Cited

U.S. PATENT DOCUMENTS

| | | | |
|---|---|---|---|
| 9,391,317 | B2 | 7/2016 | Ofer et al. |
| 9,979,014 | B2 | 5/2018 | Kim et al. |
| 2012/0009474 | A1 | 1/2012 | Yanagihara et al. |
| 2014/0106228 | A1 | 4/2014 | Toya et al. |
| 2015/0053890 | A1 | 2/2015 | Sun |
| 2015/0340686 | A1 | 11/2015 | Sun et al. |
| 2016/0156030 | A1* | 6/2016 | Sun ........................ C01G 53/44 429/219 |

FOREIGN PATENT DOCUMENTS

| | | | |
|---|---|---|---|
| JP | 2007-018744 A | 1/2007 | |
| JP | 2008-071622 A | 3/2008 | |
| JP | 2008-071623 A | 3/2008 | |
| JP | 2012-252844 A | 12/2012 | |
| KR | 1999-0051812 A | 7/1999 | |
| KR | 10-2007-0097923 A | 10/2007 | |
| KR | 10-0809847 B1 | 3/2008 | |
| KR | 10-2013-0111413 A | 10/2013 | |
| KR | 10-2014-0085347 A | 7/2014 | |
| KR | 10-2015-0070853 A | 6/2015 | |
| WO | WO-2014193203 A1 * | 12/2014 | ............. C01G 53/44 |

* cited by examiner

POSITIVE ELECTRODE ACTIVE MATERIAL FOR LITHIUM SECONDARY BATTERY, PREPARING METHOD THEREOF, AND LITHIUM SECONDARY BATTERY INCLUDING POSITIVE ELECTRODE INCLUDING THE SAME

CROSS-REFERENCE TO RELATED APPLICATION

Korean Patent Application No. 10-2015-0155787, filed on Nov. 6, 2015, in the Korean Intellectual Property Office, and entitled: "Positive Electrode Active Material for Lithium Secondary Battery, Preparing Method Thereof, and Lithium Secondary Battery Comprising Positive Electrode Including the Same," is incorporated by reference herein in its entirety.

BACKGROUND

1. Field

Embodiments relate to a positive electrode active material for a lithium secondary battery, a method of preparing the positive electrode active material, and a lithium secondary battery including a positive electrode including the positive electrode active material.

2. Description of the Related Art

A lithium secondary battery having high voltage and high-energy density characteristics may be applied to various uses. When the lithium secondary battery is applied to electric vehicles, e.g., hybrid electric vehicles (HEVs) or plug-in hybrid electric vehicles (PHEVs), the electric vehicles may be operated at a high temperature, and a discharge capacity and lifespan characteristics of the lithium secondary battery may be considered since a large amount of electricity in a battery may be charged or discharged to be used for a long time.

SUMMARY

Embodiments are directed to a positive electrode active material for a lithium secondary battery, a method of preparing the positive electrode active material, and a lithium secondary battery including a positive electrode including the positive electrode active material.

The embodiments may be realized by providing a positive electrode active material for a lithium secondary battery, the positive electrode active material comprising nickel, cobalt, and manganese, wherein the positive electrode active material has a core part and a surface part, an amount of manganese in the core part and the surface part is higher than 25 mol %, and amounts of nickel and cobalt in the positive electrode active material vary such that a concentration gradient of the nickel and the cobalt in a direction from the core part to the surface part is present in the positive electrode active material.

The amount of cobalt may increase in a direction from the core part to the surface part.

The amount of nickel may decrease in a direction from the core part to the surface part.

The amount of nickel in the core part may be about 50 mol % or higher, and the amount of nickel in the surface part may be in a range of about 30 mol % to about 40 mol %.

The amount of cobalt in the core part may be about 15 mol % or higher, and the amount of cobalt in the surface part may be in a range of about 30 mol % to about 40 mol %.

The positive electrode active material may be a compound represented by Formula 1:

$$LiNi_xCo_yMn_zO_2 \qquad \text{[Formula 1]}$$

wherein, in Formula 1, $0.40 \leq x \leq 0.70$, $0.05 \leq y \leq 0.35$, and $0.25 < z \leq 0.40$.

The positive electrode active material may have no boundary between the core part and the surface part.

A composition of the positive electrode active material at the core part thereof may continuously change to a different composition at the surface part thereof.

In the positive electrode active material, the amount of nickel in the core part may be in a range of about 50 mol % to about 55 mol %, the amount of nickel in the surface part may be in a range of about 35 mol % to about 45 mol %, and the amount of nickel may gradually decrease from the core part to the surface part; the amount of manganese in the core part and the surface part may be in a range of about 26 mol % to about 32 mol %; and the amount of cobalt in the core part may be in a range of about 15 mol % to about 25 mol %, the amount of cobalt in the surface part may be in a range of about 30 mol % to about 35 mol %, and the amount of cobalt may gradually increase from the core part to the surface part.

The embodiments may be realized by providing a method of preparing the positive electrode active material for a lithium secondary battery as claimed in claim 1, the method including mixing a positive electrode active material precursor represented by Formula 2 with a cobalt precursor, and primary heat-treating the mixture to prepare a positive electrode active material precursor having a functional gradient layer; and mixing the positive electrode active material precursor having a functional gradient layer with a lithium precursor, and secondary heat-treating the resultant to prepare the positive electrode active material:

$$Ni_xCo_yMn_zOH \qquad \text{[Formula 2]}$$

wherein, in Formula 2, $0.40 \leq x \leq 0.70$, $0.05 \leq y \leq 0.35$, and $0.25 < z \leq 0.40$.

An amount of the cobalt precursor may be in a range of about 1 part to about 5 parts by weight, based on 100 parts by weight of the positive electrode active material precursor represented by Formula 2 and the cobalt precursor.

The primary heat-treating may be performed at a temperature in a range of about 450° C. to about 800° C.

The embodiments may be realized by providing a lithium secondary battery comprising an active material, the active material including nickel, cobalt, and manganese, wherein the positive electrode active material has a core part and a surface part, an amount of manganese in the core part and the surface part is higher than 25 mol %, and amounts of nickel and cobalt in the positive electrode active material vary such that a concentration gradient of the nickel and the cobalt in a direction from the core part to the surface part is present in the positive electrode active material.

The amount of cobalt may increase in a direction from the core part to the surface part.

The amount of nickel may decrease in a direction from the core part to the surface part.

The amount of nickel in the core part may be about 50 mol % or higher, and the amount of nickel in the surface part may be in a range of about 30 mol % to about 40 mol %.

The amount of cobalt in the core part may be about 15 mol % or higher, and the amount of cobalt in the surface part may be in a range of about 30 mol % to about 40 mol %.

The positive electrode active material may be a compound represented by Formula 1:

$$LiNi_xCo_yMn_zO_2 \qquad \text{[Formula 1]}$$

wherein, in Formula 1, 0.40≤x≤0.70, 0.05≤y≤0.35, and 0.25<z≤0.40.

The positive electrode active material may have no boundary between the core part and the surface part.

In the positive electrode active material, the amount of nickel in the core part may be in a range of about 50 mol % to about 55 mol %, the amount of nickel in the surface part may be in a range of about 35 mol % to about 45 mol %, and the amount of nickel may gradually decrease from the core part to the surface part; the amount of manganese in the core part and the surface part may be in a range of about 26 mol % to about 32 mol %; and the amount of cobalt in the core part may be in a range of about 15 mol % to about 25 mol %, the amount of cobalt in the surface part may be in a range of about 30 mol % to about 35 mol %, and the amount of cobalt may gradually increase from the core part to the surface part.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
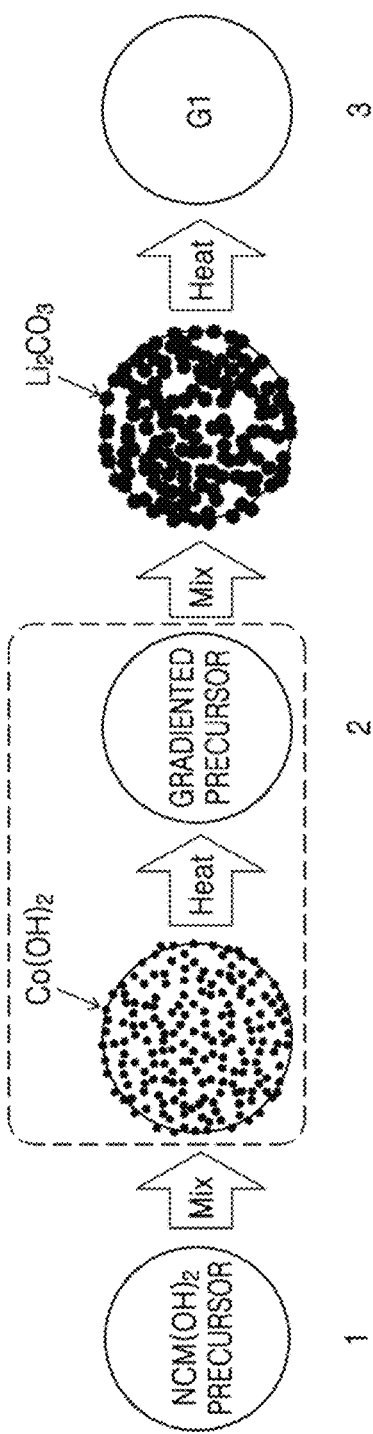
FIG. 1A illustrates a synthesis conceptual view of a positive electrode active material according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Expressions such as "at least one of," "when preceding a list of elements, modify the entire list of elements and do not modify the individual elements of the list.

Hereinafter, according to one or more exemplary embodiments, a positive electrode active material and a lithium secondary battery including a positive electrode including the positive electrode active material will be described.

The positive electrode active material for a lithium secondary battery may include, e.g., nickel, cobalt, and manganese. The positive electrode active material may include a core part (e.g., at a center of the active material) and a surface part (outside of the core part and at a surface of the active material). In an implementation, an amount of manganese included in the positive electrode active material may be, e.g., higher than 25 mol %. In an implementation, amounts of nickel and cobalt may have a concentration gradient in a direction from the core part to the surface part. For example, a concentration of nickel or cobalt in the core part may be different from a concentration of nickel or cobalt in the surface part. In an implementation, nickel and cobalt may each independently have a concentration gradient that increases or decreases in a direction from the core part to the surface part. In the positive electrode active material, the amount of manganese may be higher than about 25 mol % in both the surface part and the core part. In an implementation, the amount of manganese may be in a range of about 26 mol % to about 40 mol %. In the positive electrode active material, the amount of $Mn^{4+}$ in the positive electrode active material may be maintained the same by maintaining the amount of manganese constant in the core part and the surface part. In this regard, the amount of $Ni^{2+}$ may be maintained the same to achieve charge balance, and when a changed amount of $Ni^{2+}$ having the largest ion diameter is small, a metal slab may be relatively stabilized in a layered structure (R-3m), and thus lattice change in the core part and the surface part almost disappears, which may result in maintaining the structural stability of the positive electrode active material. Maintaining the amount of manganese at higher than about 25 mol % in the surface part and the core part of the positive electrode active material may help ensure that the stability of the positive electrode active material having a layered structure is sufficiently improved. Maintaining the amount of manganese higher than about 25 mol % in the surface part and the core part of the positive electrode active material may help ensure that the stability of the positive electrode active material improves without a decrease in a capacity thereof.

In an implementation, in the positive electrode active material, the concentration of cobalt may increase from the core part to the surface part. In an implementation, the amount of cobalt in the core part may be about 15 mol % or higher, e.g., in a range of about 15 mol % to about 25 mol %, and the amount of cobalt in the surface part may be in a range of about 30 mol % to about 35 mol %. When the amount of cobalt is in these ranges, movement of lithium ions may be facilitated according to a depth of charge, and thus output characteristics of a lithium secondary battery including a positive electrode including the positive electrode active material may be improved.

In an implementation, in the positive electrode active material, the concentration of nickel may decrease from the core part to the surface part. In an implementation, the amount of nickel in the core part may be about 50 mol % or higher, e.g., in a range of about 50 mol % to about 60 mol % or about 50 mol % to about 55 mol %, and the amount of nickel in the surface part may be in a range of about 30 mol % to about 45 mol %, e.g., about 35 mol % to about 45 mol %. A capacity of a positive electrode active material may be increased by using the nickel-rich positive electrode active material in the core part, and the stability of the positive electrode active material may be improved by gradually or continuously decreasing a concentration of nickel toward the surface part.

As used herein, the term "a core part" refers to a (e.g., inner) part of the positive electrode active material that occupies about 50 volume % to about 98 volume %, for example, about 70 volume % to about 98 volume %, of the whole positive electrode active material, and the term "a surface part" refers to a (e.g., outer) part of the positive electrode active material that occupies about 2 volume % to 50 volume %, for example, about 2 volume % to about 30 volume % of the whole positive electrode active material.

In an implementation, the positive electrode active material may include a compound represented by Formula 1.

$$LiNi_xCo_yMn_zO_2 \qquad \text{[Formula 1]}$$

In Formula 1, $0.40 \leq x \leq 0.70$, $0.05 \leq y \leq 0.35$, and $0.25 < z \leq 0.40$.

In an implementation, the compound represented by Formula 1 may be, e.g., $LiNi_{0.5}Co_{0.2}Mn_{0.3}O_2$, $LiNi_{0.55}Co_{0.19}Mn_{0.26}O_2$, or $LiNi_{0.55}Co_{0.15}Mn_{0.3}O_2$.

When the amount of metal changes stepwise or discontinuously in the core part and the surface part of the positive electrode active material, a clear or distinct boundary may be formed between the surface part and the core part due to the drastic or abrupt change in the amount of metal. When amounts of nickel, cobalt, and manganese between the surface part and the core part in the positive electrode active material almost do not drastically increase or decrease in a stepwise or abrupt manner, but rather increase or decrease gradually or continuously, substantially no distinct boundary may be formed between the surface part and the core part. In this regard, when a boundary is not formed or substantially not formed between the core part and the surface part, heterogeneity caused by the composition difference between the core part and the surface part of the positive electrode active material may be reduced and/or prevented, and thus the structural stability of the positive electrode active material may improve.

FIG. 1A illustrates a synthesis conceptual view of the positive electrode active material according to an exemplary embodiment.

As shown in FIG. 1A, when a cobalt hydroxide, which is a cobalt precursor, is mixed with a positive electrode active material precursor 1, and the mixture is primary heat-treated, a positive electrode active material precursor 2 having a functional gradient layer may be obtained. When a lithium carbonate is added to the positive electrode active material precursor 2 having a functional gradient layer, and the resultant is heat-treated, a desired positive electrode active material 3 may be obtained. Each of the materials in the surface part and the core part of the positive electrode active material may have a layered structure. Also, the functional gradient layer may include, e.g., a cobalt oxide, a lithium cobalt oxide, or a mixture or a composite thereof, as a cobalt-rich coating layer.

In an implementation, the amount of nickel in the core part of the positive electrode active material may be in a range of about 50 mol % to about 55 mol %, the amount of nickel in the surface part of the positive electrode active material may be in a range of about 35 mol % to about 45 mol %, and the amount of nickel may gradually or continuously decrease from the core part to the surface part. In an implementation, the amount of manganese in the core part and the surface part of the positive electrode active material may be in a range of about 26 mol % to about 32 mol %. In an implementation, the amount of cobalt in the core part of the positive electrode active material may be in a range of about 15 mol % to about 25 mol %, the amount of cobalt in the surface part of the positive electrode active material may be in a range of about 30 mol % to about 35 mol %, and the amount of cobalt may gradually or continuously increase from the core part to the surface part.

Hereinafter, a method of preparing a positive electrode active material, according to another exemplary embodiment, will be described.

First, a positive electrode active material precursor represented by Formula 2, below, may be mixed with a cobalt precursor, and the mixture may be primary heat-treated to prepare a positive electrode active material precursor having a functional gradient layer.

$$Ni_xCo_yMn_zOH \qquad \text{[Formula 2]}$$

In Formula 2, $0.40 \leq x \leq 0.70$, $0.05 \leq y \leq 0.35$, and $0.25 < z \leq 0.40$.

Then, the positive electrode active material precursor thus prepared may be mixed with a lithium precursor, and the resultant may be secondary heat-treated to obtain a desired positive electrode active material.

The positive electrode active material precursor may be mixed with the cobalt precursor by using a dry mixing method, a wet mixing method, or both methods.

The cobalt precursor may include, e.g., a cobalt hydroxide, a cobalt chloride, or a cobalt sulfate. An average particle diameter of the cobalt precursor may be in a range of about 50 nm to about 300 nm, e.g., about 100 nm to about 200 nm. When the average particle diameter of the cobalt precursor is within this range, the positive electrode active material precursor having a functional gradient layer may be easily obtained.

The primary heat-treatment may be performed at a temperature, e.g., in a range of about 450° C. to about 800° C. When the temperature of the primary heat-treatment is within this range, a positive electrode active material precursor having a functional gradient layer may be easily obtained.

The secondary heat-treatment may be performed at a temperature, e.g., in a range of about 600° C. to about 900° C. under an oxidative gas atmosphere. When the temperature of the secondary heat-treatment is within this range, a positive electrode active material precursor that is structurally stable may be obtained. The oxidative gas atmosphere may refer to, e.g., an air or oxygen atmosphere.

The amount of the cobalt precursor may be in a range of about 1 part to about 5 parts by weight, based on 100 parts by weight of the positive electrode active material precursor represented by Formula 2 and the cobalt precursor. When the amount of the cobalt precursor is within this range, a positive electrode active material without or substantially without a distinct boundary between a core part and a surface part of the positive electrode active material may be obtained.

The lithium precursor may include, e.g., a lithium carbonate or a lithium hydroxide. The amount of the lithium precursor may be in a range of about 1.0 mole to about 1.2 mole, based on 1 mole of the positive electrode active material precursor.

In an implementation, the positive electrode active material precursor represented by Formula 2 may be prepared as follows.

A nickel precursor, a cobalt precursor, a manganese precursor, and a solvent may be mixed with each other to prepare a metal precursor mixture.

An example of the nickel precursor may include a nickel sulfate, a nickel chloride, or a nickel nitrate. An example of the cobalt precursor may include a cobalt sulfate, a cobalt chloride, or a cobalt nitrate. An example of the manganese precursor may include a manganese sulfate, a manganese chloride, or a manganese nitrate.

Amounts of the nickel precursor, cobalt precursor, and manganese precursor may be stoichiometrically controlled to obtain the positive electrode active material precursor of Formula 2.

An example of the solvent may include water, ethanol, propanol, or butanol. In an implementation, the amount of the solvent may be in a range of about 100 parts to about 2,000 parts by weight, based on 100 parts by weight of the nickel precursor, cobalt precursor, and manganese precursor.

In an implementation, a complexing agent and/or a pH controlling agent may be added and mixed to the metal precursor mixture.

An example of the complexing agent may include ammonia water as a source of ammonium ions.

An example of the pH controlling agent may include a sodium hydroxide solution.

A pH of the resultant may be controlled to a range of about 11 to about 13 by using the pH controlling agent.

When a precipitate is obtained from the resultant, and the precipitate may be washed by using pure water and then dried, a positive electrode active material precursor of Formula 2 may be obtained. The drying process may be performed at a temperature in a range of about 100° C. to about 120° C.

A positive electrode including the positive electrode active material may be prepared as follows.

A positive electrode active material composition may be prepared by mixing the positive electrode active material, a binder, and a solvent. A conducting agent may be further added to the positive electrode active material composition.

In an implementation, the positive electrode active material composition may be directly coated and dried on a current collector to prepare a positive electrode plate. In an implementation, the positive electrode active material composition may be cast on a separate support, and a film detached from the support may be laminated on a metal current collector to prepare a positive electrode plate.

In the positive electrode active material composition, a conducting agent, a binder, and a solvent may be the same as those used in the preparation of the negative electrode active material composition. In an implementation, a plasticizer may be further added to the positive electrode active material composition and/or negative electrode active material composition to form pores in the electrode plate.

In an implementation, the conducting agent may include, e.g., carbon black, graphite particles, natural graphite, artificial graphite, acetylene black, Ketjen black, carbon fibers, or carbon nanotubes; metal powder, metal fibers, or metal tubes of copper, nickel, aluminum, or silver; or a conductive polymer such as a polyphenylene derivative. The amount of the conducting agent may be in a range of about 2 parts to about 5 parts by weight, based on 100 parts by weight of the positive electrode active material. When the amount of the conducting agent is within this range, conductivity characteristics of an electrode thus prepared as a result may improve.

In an implementation, the binder may include, e.g., a vinylidene fluoride/hexafluoropropylene copolymer, polyvinylidene fluoride, polyimide, polyethylene, polyester, polyacrylonitrile, polymethylmethacrylate, polytetrafluoroethylene (PTFE), a carboxymethyl cellulose-styrene-butadiene rubber (CMC/SBR) copolymer, a styrene butadiene rubber-based polymer, or a mixture thereof. The amount of the binder may be in a range of about 2 parts to about 5 parts by weight, based on 100 parts by weight of the positive electrode active material. When the amount of the binder is within this range, a binding force of the active material layer to the current collector is good.

In an implementation, the solvent may include, e.g., N-methylpyrrolidone, acetone, or water.

Amounts of the positive electrode active material and the solvent used herein may be used at levels suitable for a lithium battery. In an implementation, according to a purpose and structure of the lithium battery, one or more of the conducting agent, the binder, and the solvent may be omitted.

The negative electrode may be prepared by using the same method used to prepare the positive electrode, except that a negative electrode active material may be used instead of the positive electrode active material in the preparation of the positive electrode.

The negative electrode active material may include, e.g., a carbonaceous material, silicon, a silicon oxide, a silicon-based alloy, a silicon-carbonaceous material composite, tin, a tin-based alloy, a tin-carbon composite, a metal oxide, or a combination thereof.

The carbonaceous material may include, e.g., crystalline carbon, amorphous carbon, or a mixture thereof. Examples of the crystalline carbon may include graphite such as natural graphite or artificial graphite in non-shaped, plate-shaped, flake, spherical, or fibrous form, and examples of the amorphous carbon may include soft carbon (carbon sintered at low temperature), hard carbon, meso-phase pitch carbonization products, sintered cokes, graphene, carbon black, fullerene soot, carbon nanotubes, or carbon fibers.

The negative electrode active material may be selected from Si, SiOx (where, $0<x<2$, or, for example, $0.5<x<1.5$), Sn, $SnO_2$, a silicon-containing metal alloy, and a mixture thereof. A metal for forming the silicon-containing metal alloy may be at least one selected from Al, Sn, Ag, Fe, Bi, Mg, Zn, in, Ge, Pb, and Ti.

The negative electrode active material may include a metal/semi-metal or metalloid alloyable with lithium, an alloy thereof, or an oxide thereof. Examples of the metal/metalloid alloyable with lithium, an alloy thereof, or an oxide thereof may include Si, Sn, Al, Ge, Pb, Bi, Sb, a Si—Y' alloy (where, Y' is an alkali metal, an alkali earth metal, a Group 13 element, a Group 14 element, a transition metal, a rare-earth element, or a combination thereof, but not Si), a Sn—Y' alloy (where, Y' is an alkali metal, an alkali earth metal, a Group 13 element, a Group 14 element, a transition metal, a rare-earth element, or a combination thereof, but not Sn), and $MnO_x$ (where, $0<x \leq 2$). The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof. Examples of the oxide of the metal/metalloid alloyable with lithium may include a lithium titanium oxide, a vanadium oxide, a lithium vanadium oxide, $SnO_2$, and $SiO_x$ (where, $0<x<2$).

The negative electrode active material may include, e.g., at least one selected from Group 13 elements, Group 14 elements, and Group 15 elements.

The negative electrode active material may include, e.g., at least one selected from Si, Ge, and Sn.

Amounts of the negative electrode active material, the conducting agent, the binder, and the solvent used herein may be used at levels suitable for a lithium battery.

The current collector may be a suitable current collector material that does not generate any chemical change in the battery and has a high conductivity. Examples of the current collector may include copper, stainless steel, aluminum, nickel, titanium, calcined carbon, copper or stainless steel that is surface-treated with carbon, nickel, titanium, or silver, and an aluminum-cadmium alloy. The current collector for a positive electrode may have an uneven micro structure at its surface to help enhance a binding force with the positive electrode active material. In an implementation, the current collector may be used in various forms including a film, a sheet, a foil, a net, a porous body, a foaming body, or a non-woven body. For example, the current collector for a positive electrode may be a metal current collector including aluminum, and the current collector for a negative electrode may be a metal current collector including copper. The current collector may be a metal foil, e.g., an aluminum (Al) foil or a copper (Cu) foil.

A separator may be disposed between the positive electrode and the negative electrode, and the separator is an insulating thin film having a high ion permeability and a high mechanical strength.

A pore diameter of the separator may be in a range of about 0.01 μm to about 10 μm, and a thickness of the separator may be in a range of about 5 μm to about 20 μm. The separator may include, e.g., an olefin-based polymer such as polypropylene; or a sheet or non-woven fabric formed of glass fibers or polyethylene. When a solid polymer electrolyte is used as the electrolyte, the solid polymer electrolyte may serve as a separator at the same time.

The separator may have a multi-layer structure including at least two layers of polyethylene, polypropylene, or polyvinylidene fluoride, and a mixed multi-layer structure may be used, wherein examples of the mixed multi-layer structure may include a two-layer separator of polyethylene/polypropylene, a three-layer separator of polyethylene/polypropylene/polyethylene, and a three-layer separator of polypropylene/polyethylene/polypropylene.

A lithium salt-containing non-aqueous based electrolyte solution may include a non-aqueous electrolyte and a lithium salt.

Examples of the non-aqueous electrolyte may include a non-aqueous electrolyte solution, an organic solid electrolyte, and an inorganic solid electrolyte.

The non-aqueous electrolyte solution may include an organic solvent, which may be a suitable material available as an organic solvent. Examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethylsulfoxide, dioxane, 1,2-dimethoxyethane, sulfolane, dichloroethane, chlorobenzene, nitrobenzene, diethyleneglycol, dimethyl ether, or a mixture thereof.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte may include nitrides, halides, and sulfates of lithium such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be soluble in the non-aqueous electrolyte. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$. $LiN(C_xF_{2x+1}SO_2)(C_yF_{2y+1}SO_2)$ (where, x and y are a natural number), $LiCl$, $LiI$, or a mixture thereof. Also, in order to improve charging/discharging characteristics or flame resistance of the electrolyte, e.g., the non-aqueous electrolyte may further include pyridine, triethylphosphite, triethanolamine, cyclic ether, ethylenediamine, n-glyme, hexamethyl phosphoramide, nitrobenzene derivatives, sulfur, quinone imide dyes, N-substituted oxazolidinone, N,N-substituted imidazolidine, ethyleneglycol dialkylether, ammonium salts, pyrrole, 2-methoxyethanol, or aluminum trichloride. In some embodiments, in order to impart incombustibility, the electrolyte may further include a halogen-containing solvent such as carbon tetrachloride or ethylene trifluoride.

Figure 1B:
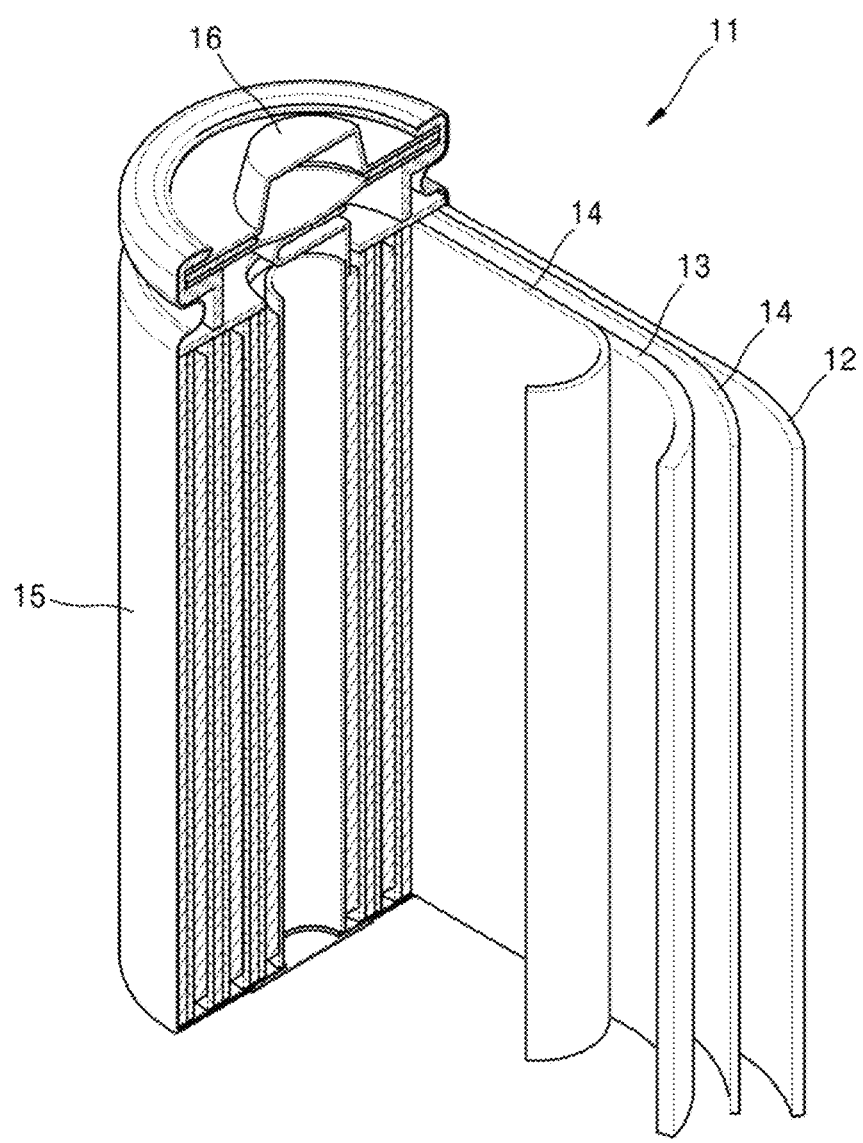
FIG. 1B illustrates a schematic view of a lithium secondary battery according to an exemplary embodiment.

As shown in FIG. 1B, a lithium secondary battery 11 may include a positive electrode 13, a negative electrode 12, and a separator 14. The positive electrode 13, the negative electrode 12, and the separator 14 may be wound and/or folded to be accommodated in a battery case 15. Then, an organic electrolyte solution may be injected into the battery case 15, and the battery case 15 may be sealed with a cap assembly 16, thereby completing the manufacture of the lithium battery 11. The battery case 15 may have a shape of a cylinder, a box, or a film. In an implementation, the lithium secondary battery 11 may be a thin-film type battery. In an implementation, the lithium secondary battery 11 may be a lithium ion battery.

A battery assembly may be prepared by disposing a separator between a positive electrode and a negative electrode. A plurality of the battery assemblies may be stacked in a bi-cell structure and impregnated with an organic electrolyte solution. The resultant is then put into a pouch and sealed, thereby completing the manufacture of a lithium ion polymer battery. Also, a plurality of the battery assemblies may be stacked to form a battery pack, which may be used in any device that requires high capacity and high output, for example, in a laptop computer, a smart phone, or an electric vehicle (EV).

The lithium secondary battery according to an embodiment may be used as a unit battery in a medium-to-large sized battery module including a plurality of battery cells, as well as in a battery cell as a power source of a small-sized device.

Also, provided is a battery pack that includes the battery module as a power source of a medium-to-large sized device, and examples of the medium-to-large sized device may include electric cars or electric power storage devices such as an electric vehicle (EV), a hybrid electric vehicle (HEV), and a plug-in hybrid electric vehicle (PHEV).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

Preparation of Positive Electrode Active Material

A positive electrode active material precursor $(Ni_{0.5}Co_{0.2}Mn_{0.3}(OH)_2)$ was mixed with a cobalt hydroxide (Co(OH)$_2$), and the mixture was heated at a temperature of about 500° C. for about 9.5 hours to prepare a positive electrode active material precursor having a functional gradient layer. The amount of the cobalt hydroxide was about 3 parts by weight, based on 100 parts by weight of the positive electrode active material precursor and the cobalt hydroxide.

The positive electrode active material precursor was mixed with a lithium carbonate at a molar ratio of 1:1.03, and the mixture was added to a furnace and heated under an oxygen atmosphere at a temperature of about 750° C. for about 16 to 17 hours to prepare a positive electrode active material.

Both a core part and a surface part of the positive electrode active material thus prepared had a layered structure.

COMPARATIVE EXAMPLE 1

Preparation of Positive Electrode Active Material

A positive electrode active material precursor (Ni$_{0.5}$Co$_{0.2}$Mn$_{0.3}$(OH)$_2$ was mixed with a lithium carbonate at a molar ratio of 1:1.03, and the mixture was added to a furnace and heated in an oxygen atmosphere at a temperature of about 750° C. for about 16 to 17 hours to prepare a positive electrode active material (LiNi$_{0.5}$Co$_{0.2}$Mn$_{0.3}$O$_2$).

COMPARATIVE EXAMPLE 2

Preparation of Positive Electrode Active Material

A positive electrode active material was obtained in the same manner as in Example 1, except that a positive electrode active material precursor (Ni$_{0.5}$Co$_{0.3}$Mn$_{0.2}$(OH)$_2$) was used instead of the positive electrode active material precursor (Ni$_{0.5}$Co$_{0.2}$Mn$_{0.3}$(OH)$_2$).

Both a core part and a surface part of the positive electrode active material thus prepared had a layered structure.

EXAMPLE 2

Preparation of Lithium Secondary Battery

The positive electrode active material prepared in Example 1, polyvinylidene fluoride, and carbon black, as a conducting agent, were mixed with each other to prepare a slurry for a positive electrode active material layer. N-methylpyrrolidone, as a solvent, was added to the slurry, and a mixing ratio of the positive electrode active material, polyvinylidene fluoride, and carbon black was 94:3:3 at a weight ratio.

The slurry thus prepared was coated on an aluminum thin film by using a doctor blade in the form of a thin electrode plate, and the coated slurry was dried at a temperature of 135° C. for 3 hours or more. Then, the resultant was pressed and vacuum-dried to prepare a positive electrode.

The positive electrode and a lithium metal electrode, as a counter electrode, were used to prepare a coin cell of 2032-type. A separator (having a thickness of about 16 μm) formed of a porous polyethylene (PE) film was disposed between the positive electrode and the lithium metal electrode, and an electrolyte solution was injected thereto to prepare the coin cell.

The electrolyte solution was a solution prepared by preparing a 1.1 M LiPF$_6$ solution in a mixed solvent including ethylene carbonate (EC), ethylmethyl carbonate (EMC), and dimethyl carbonate (DMC) that were mixed with each other at a volume ratio of 3:4:3.

EXAMPLE 3

Preparation of Positive Electrode Active Material

A positive electrode active material was prepared in the same manner as in Example 1, except that the amount of the cobalt hydroxide was changed to be in a range of about 1 part by weight, based on 100 parts by weight of the positive electrode active material precursor and the cobalt hydroxide.

EXAMPLE 4

Preparation of Positive Electrode Active Material

A positive electrode active material was prepared in the same manner as in Example 1, except that the amount of the cobalt hydroxide was changed to be in a range of about 5 parts by weight, based on 100 parts by weight of the positive electrode active material precursor and the cobalt hydroxide.

EXAMPLES 5 and 6

Preparation of Lithium Secondary Batteries

Lithium secondary batteries were prepared in the same manner as in Example 2, except that the positive electrode active material prepared in Example 3 and the positive electrode active material prepared in Example 4 were respectively used instead of the positive electrode active material prepared in Example 1.

COMPARATIVE EXAMPLES 3 and 4

Preparation of Lithium Secondary Batteries

Lithium secondary batteries were prepared in the same manner as in Example 2, except that the positive electrode active material prepared in Comparative Example 1 and the positive electrode active material prepared in Comparative Example 2 were respectively used instead of the positive electrode active material prepared in Example 1.

EVALUATION EXAMPLE 1

Scanning Electron Microscope (SEM) and Mass Analysis

A focused ion beam scanning electron microscope (FIB-SEM) analysis and a time-of-flight secondary ion mass spectrometry (TOF-SIMS) analysis were performed on the positive electrode active material prepared in Example 1, and thus components and depth distribution of a surface of the positive electrode active material were analyzed. An analyzer for the FIB-SEM analysis was Quanta FEG 250 available from FEI, and an analyzer for the TOF-SIMS analysis was nano TOF II available from ULVAC-PHI.

Figure 2:
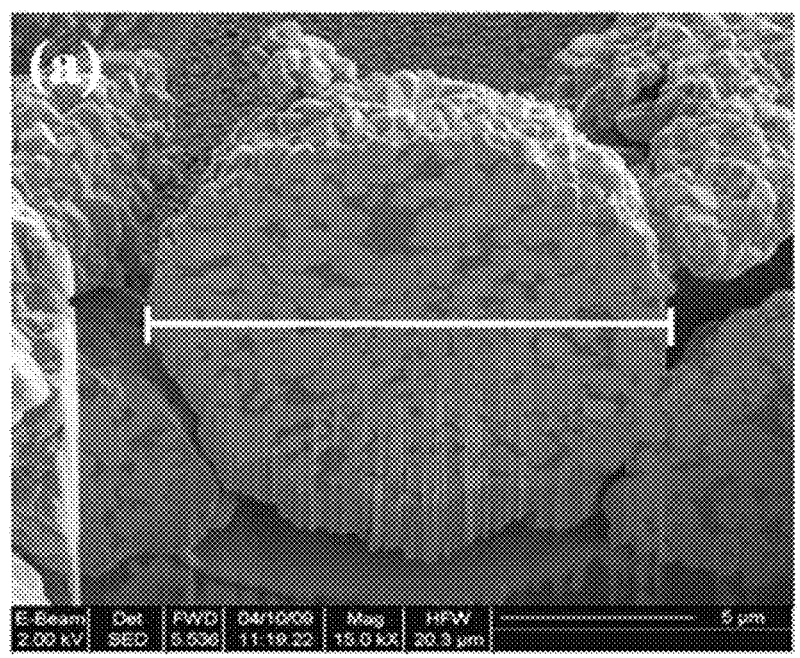
FIG. 2 illustrates a focused ion beam scanning electron microscope (FIB-SEM) image of a positive electrode active material prepared in Example 1.
Figure 3:
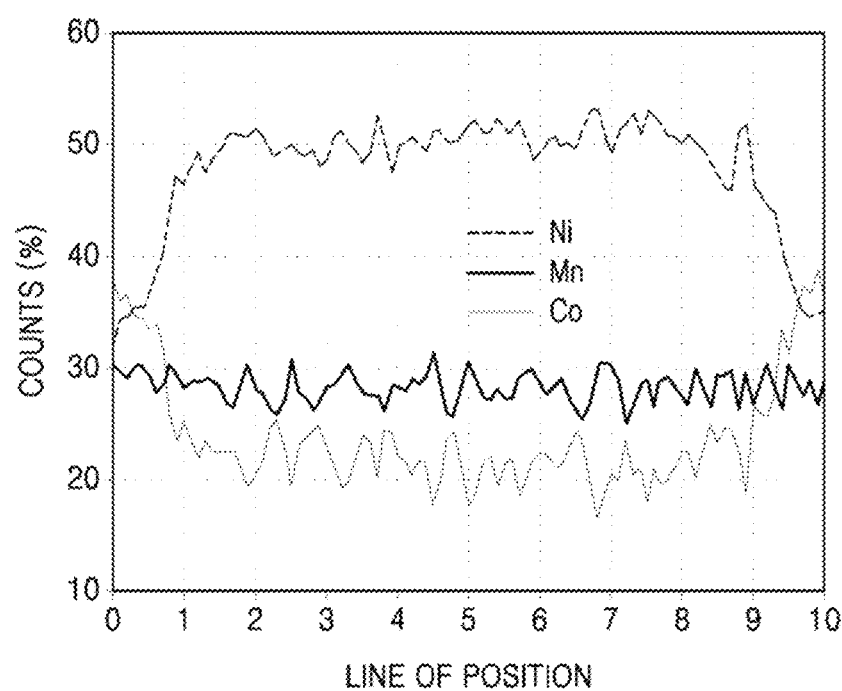
FIG. 3 illustrates the results of analysis by using a time-of-flight secondary ion mass spectrometry (TOS-SIMS) performed on the positive electrode active material prepared in Example 1.

The results of the FIB-SEM and TOF-SIMS analysis are shown in FIGS. 2 and 3, respectively.

Referring to FIGS. 2 and 3, it may be seen that the positive electrode active material prepared in Example 1 had no clear core-shell boundary, and compositions of the core and the shell changed with a concentration gradient. As shown in FIG. 3, in the positive electrode active material prepared in Example 1, amounts of nickel, manganese, and cobalt in a core part were about 50 mol %, about 30 mol %, and about 20 mol %, respectively. Also, the amount of nickel in a surface part was about 34 mol %, which decreased in a direction from the core part to the surface part of the positive electrode active material. Also, it may be seen that amounts of manganese in the surface part and the core part were almost the same at about 31 mol %, and the amount of cobalt in the surface part was about 35 mol %, which increased in a direction from the core part to the surface part of the positive electrode active material. In this regard, unlike other positive electrode active materials that have a core part-surface part structure (or a core/shell structure), the positive electrode active material of Example 1 did not have a distinct boundary between the core part and the surface part, and compositions of metals in the core part and the surface part continuously changed with a concentration gradient.

EVALUATION EXAMPLE 2

Chemical Diffusion Coefficient Measurement

Figure 4:
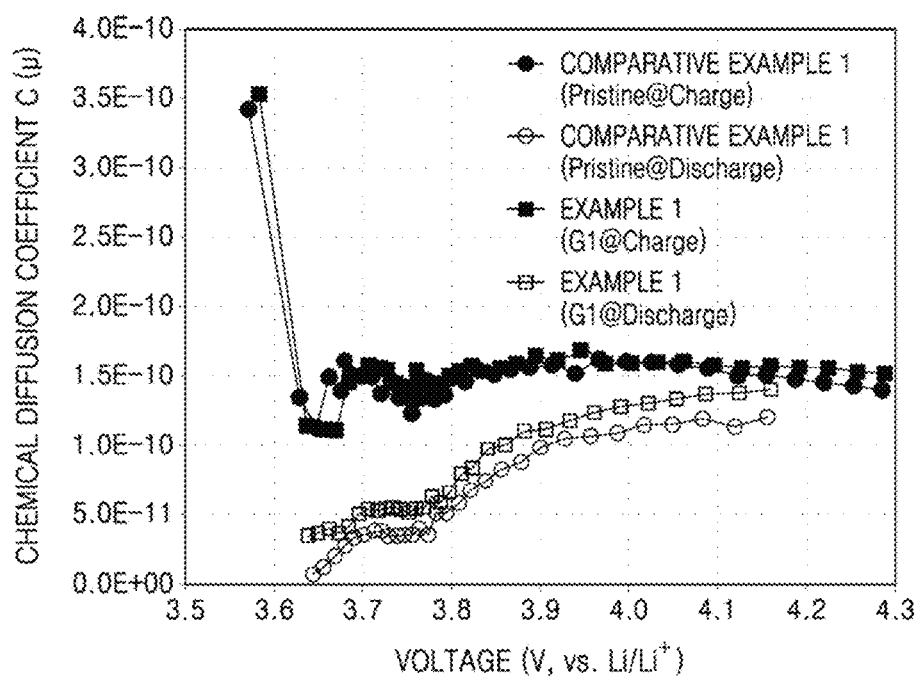
FIG. 4 illustrates the results of measuring chemical diffusion coefficients of positive electrode active material prepared in Example 1 and Comparative Example 1.

Chemical diffusion coefficients of the positive electrode active materials prepared in Example 1 and Comparative Example 1 were measured by using a galvanostatic intermittent titration technique (GITT), and the results are shown in FIG. 4.

Referring to FIG. 4, a chemical diffusion coefficient of the positive electrode active material of Example 1 was higher than that of the positive electrode active material of Comparative Example 1, and, the diffusion coefficient was further higher during a discharging process. In this regard, it may be seen that a composition the positive electrode active material of Example 1 exhibited better output characteristics of the positive electrode active material by having a functional gradient layer, as compared to a composition of the positive electrode active material of Comparative Example 1.

EVALUATION EXAMPLE 3

Charging/Discharging Characteristics

Charging/discharging characteristics of the lithium secondary batteries prepared in Examples 2, 5, and 6, and Comparative Examples 3 and 4 were evaluated under conditions described as follows by using a charging/discharging device (Model: TOYO-3100, available from TOYO).

First, the batteries prepared in Examples 2, 5, and 6, and Comparative Example 3 were each charged once at 0.1 C to perform a formation process, and then the battery was charged/discharged once at 0.2 C to confirm initial charging/discharging characteristics. The charging/discharging process was then repeated 300 times to observe cycle characteristics of the battery, and the results are shown in FIG. 5.

The charging process was set to start with a constant current (CC) mode and changed to a constant voltage (CV) mode of about 4.3 V to a cut-off at 0.05 C, and the discharging process was set to be cut-off at a voltage of 2.8 V in a constant current (CC) mode.

Figure 5:
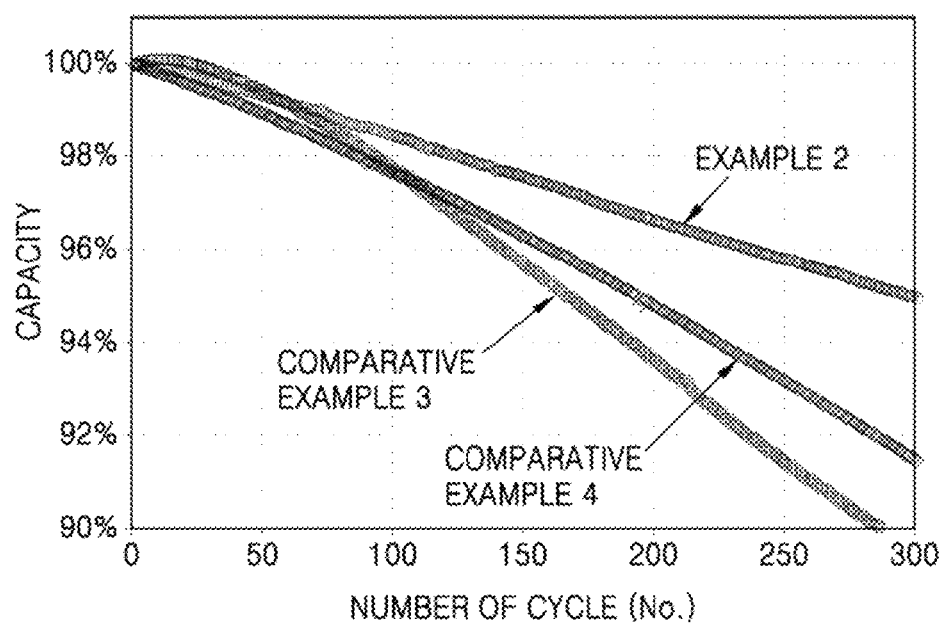
FIG. 5 illustrates a capacity retention ratio graph of lithium secondary batteries prepared in Example 2 and Comparative Example 3 and 4.

As shown in FIG. 5, it may be seen that the lithium secondary battery of Example 2 exhibited an improved capacity retention ratio, compared to the lithium secondary batteries prepared in Comparative Examples 3 and 4.

Also, the lithium secondary batteries prepared in Examples 5 and 6 had the same capacity retention ratio characteristics as those of the lithium secondary battery prepared in Example 2.

By way of summation and review, a lithium cobalt oxide having excellent energy density may be used as a positive electrode active material for a lithium secondary battery. However, a manufacturing cost of the lithium cobalt oxide may be expensive, and stability and capacity of the positive electrode active material may not achieve satisfactory levels.

As described above, according to one or more exemplary embodiment, a positive electrode active material may have good structural stability and suppression effect to a side reaction with an electrolyte solution. When a positive electrode including the positive electrode active material is included in a lithium secondary battery, the lithium secondary battery may have improved capacity and lifespan characteristics.

The embodiments may provide a positive electrode active material for a lithium secondary battery that is structurally stable in that a side reaction with an electrolyte solution is suppressed.

The embodiments may provide a lithium secondary battery that includes a positive electrode including the positive electrode active material, and thus a capacity and lifespan characteristics of the lithium secondary battery are good.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive electrode active material for a lithium secondary battery, the positive electrode active material comprising nickel, cobalt, and manganese,
   wherein:
   the positive electrode active material has a core part and a surface part,
   an amount of manganese in the core part and the surface part is higher than 25 mol %,
   amounts of nickel and cobalt in the positive electrode active material vary such that a concentration gradient of the nickel and the cobalt in a direction from the core part to the surface part is present in the positive electrode active material,
   the amount of nickel in the core part is about 50 mol % or higher, and
   the amount of nickel in the surface part is in a range of about 30 mol % to about 40 mol %.

2. The positive electrode active material as claimed in claim 1, wherein the amount of cobalt increases in a direction from the core part to the surface part.

3. The positive electrode active material as claimed in claim 1, wherein:
   the amount of cobalt in the core part is about 15 mol % or higher, and
   the amount of cobalt in the surface part is in a range of about 30 mol % to about 40 mol %.

4. The positive electrode active material as claimed in claim 1, wherein the positive electrode active material is a compound represented by Formula 1:

$$LiNi_xCo_yMn_zO_2 \qquad \text{[Formula 1]}$$

wherein, in Formula 1, 0.40≤x≤0.70, 0.05≤y≤0.35, and 0.25<z≤0.40.

5. The positive electrode active material as claimed in claim 1, wherein the positive electrode active material has no boundary between the core part and the surface part.

6. The positive electrode active material as claimed in claim 1, wherein a composition of the positive electrode active material at the core part thereof continuously changes to a different composition at the surface part thereof.

7. The positive electrode active material as claimed in claim 1, wherein, in the positive electrode active material,
the amount of nickel in the core part is in a range of about 50 mol % to about 55 mol %, the amount of nickel in the surface part is in a range of about 35 mol % to about 45 mol %, and the amount of nickel gradually decreases from the core part to the surface part;
the amount of manganese in the core part and the surface part is in a range of about 26 mol % to about 32 mol %; and
the amount of cobalt in the core part is in a range of about 15 mol % to about 25 mol %, the amount of cobalt in the surface part is in a range of about 30 mol % to about 35 mol %, and the amount of cobalt gradually increases from the core part to the surface part.

8. A method of preparing the positive electrode active material for a lithium secondary battery as claimed in claim 1, the method comprising:
mixing a positive electrode active material precursor represented by Formula 2 with a cobalt precursor, and primary heat-treating the mixture to prepare a positive electrode active material precursor having a functional gradient layer; and
mixing the positive electrode active material precursor having a functional gradient layer with a lithium precursor, and secondary heat-treating the resultant to prepare the positive electrode active material:

$Ni_xCo_yMn_zOH$      [Formula 2]

wherein, in Formula 2, 0.40≤x≤0.70, 0.05≤y≤0.35, and 0.25<z≤0.40.

9. The method as claimed in claim 8, wherein an amount of the cobalt precursor is in a range of about 1 part to about 5 parts by weight, based on 100 parts by weight of the positive electrode active material precursor represented by Formula 2 and the cobalt precursor.

10. The method as claimed in claim 8, wherein the primary heat-treating is performed at a temperature in a range of about 450° C. to about 800° C.

11. A lithium secondary battery comprising an active material, the active material including nickel, cobalt, and manganese,
wherein:
the positive electrode active material has a core part and a surface part,
an amount of manganese in the core part and the surface part is higher than 25 mol %, and
amounts of nickel and cobalt in the positive electrode active material vary such that a concentration gradient of the nickel and the cobalt in a direction from the core part to the surface part is present in the positive electrode active material,
the amount of nickel in the core part is about 50 mol % or higher, and
the amount of nickel in the surface part is in a range of about 30 mol % to about 40 mol %.

12. The lithium secondary battery as claimed in claim 11, wherein the amount of cobalt increases in a direction from the core part to the surface part.

13. The lithium secondary battery as claimed in claim 11, wherein:
the amount of cobalt in the core part is about 15 mol % or higher, and
the amount of cobalt in the surface part is in a range of about 30 mol % to about 40 mol %.

14. The lithium secondary battery as claimed in claim 11, wherein the positive electrode active material is a compound represented by Formula 1:

$LiNi_xCo_yMn_zO_2$      [Formula 1]

wherein, in Formula 1, 0.40≤x≤0.70, 0.05≤y≤0.35, and 0.25<z≤0.40.

15. The lithium secondary battery as claimed in claim 11, wherein the positive electrode active material has no boundary between the core part and the surface part.

16. The lithium secondary battery as claimed in claim 11, wherein, in the positive electrode active material,
the amount of nickel in the core part is in a range of about 50 mol % to about 55 mol %, the amount of nickel in the surface part is in a range of about 35 mol % to about 45 mol %, and the amount of nickel gradually decreases from the core part to the surface part;
the amount of manganese in the core part and the surface part is in a range of about 26 mol % to about 32 mol %; and
the amount of cobalt in the core part is in a range of about 15 mol % to about 25 mol %, the amount of cobalt in the surface part is in a range of about 30 mol % to about 35 mol %, and the amount of cobalt gradually increases from the core part to the surface part.

17. The positive electrode active material as claimed in claim 1, wherein the amount of manganese in the core part and the amount of manganese in the surface part is constant.

18. The lithium secondary battery as claimed in claim 11, wherein, in the positive electrode active material, the amount of manganese in the core part and the amount of manganese in the surface part is constant.

* * * * *